United States Patent
Baumgartner et al.

(10) Patent No.: US 12,441,846 B2
(45) Date of Patent: Oct. 14, 2025

(54) ELASTOMER WITH C—O—Si LINKAGES BETWEEN POLYESTER BACKBONE AND CROSSLINKER

(71) Applicant: Dow Silicones Corporation, Midland, MI (US)

(72) Inventors: Ryan Baumgartner, Midland, MI (US); Shane Mangold, Midland, MI (US); Zachary Wenzlick, Midland, MI (US)

(73) Assignee: Dow Silicones Corporation, Midland, MI (US)

( * ) Notice: Subject to any disclaimer, the term of this patent is extended or adjusted under 35 U.S.C. 154(b) by 0 days.

(21) Appl. No.: 19/102,442

(22) PCT Filed: Sep. 5, 2023

(86) PCT No.: PCT/US2023/031956
§ 371 (c)(1),
(2) Date: Feb. 10, 2025

(87) PCT Pub. No.: WO2024/054422
PCT Pub. Date: Mar. 14, 2024

(65) Prior Publication Data
US 2025/0263521 A1    Aug. 21, 2025

Related U.S. Application Data

(60) Provisional application No. 63/404,982, filed on Sep. 9, 2022.

(51) Int. Cl.
| | | |
|---|---|---|
| *C08G 77/445* | (2006.01) | |
| *A61K 8/04* | (2006.01) | |
| *A61K 8/85* | (2006.01) | |
| *A61Q 19/00* | (2006.01) | |
| *C08G 63/695* | (2006.01) | |

(52) U.S. Cl.
CPC ............ *C08G 77/445* (2013.01); *A61K 8/044* (2013.01); *A61K 8/85* (2013.01); *A61Q 19/00* (2013.01); *C08G 63/6952* (2013.01); *C08G 63/6956* (2013.01); *A61K 2800/10* (2013.01)

(58) Field of Classification Search
CPC ...................................... C08L 83/04
See application file for complete search history.

(56) References Cited

U.S. PATENT DOCUMENTS

| | | | |
|---|---|---|---|
| 5,169,641 A * | 12/1992 | Jorda ................ | C08G 18/10 528/26 |
| 6,043,328 A | 3/2000 | Domschke et al. | |
| 6,476,123 B1 | 11/2002 | Morita et al. | |
| 6,531,542 B1 | 3/2003 | Morita et al. | |
| 10,676,572 B1 | 6/2020 | Rodriguez et al. | |
| 2004/0129916 A1 | 7/2004 | Takaoka et al. | |
| 2023/0295426 A1* | 9/2023 | Okabe ................ | C08L 83/10 528/26 |

FOREIGN PATENT DOCUMENTS

| | | | | |
|---|---|---|---|---|
| EP | 0182316 | | 2/1992 | |
| EP | 3806818 | | 11/2021 | |
| GB | 735405 | | 8/1955 | |
| JP | 4037579 | | 1/2008 | |
| JP | 5676068 | | 2/2015 | |
| WO | 2022019179 | | 1/2022 | |
| WO | 2022203801 | | 9/2022 | |
| WO | WO-2023120690 A1 * | 6/2023 | ........ C08F 299/0492 |

OTHER PUBLICATIONS

"Synthesis and Study of Block Copolycondensates Containing Polysiloxane and Unsaturated Polyester Blocks in the Chain. I. Poly(unsaturated Esters-b-Siloxanes) with Blocks Linked by Si—O—C bonds" authored by Madec et al. and published in the Journal of Polymer Science (1978) 16(12) 3157-3163.*

* cited by examiner

*Primary Examiner* — Marc S Zimmer
(74) *Attorney, Agent, or Firm* — Steven W. Mork

(57) ABSTRACT

A composition containing an elastomer, the elastomer characterized by having a polyester backbone crosslinked with a crosslinker and having a carbon-oxygen-silicon linkage between ester groups and crosslinkers.

9 Claims, No Drawings

ELASTOMER WITH C—O—Si LINKAGES BETWEEN POLYESTER BACKBONE AND CROSSLINKER

FIELD OF THE INVENTION

The present invention relates to elastomers and gels and pastes comprising the elastomers.

INTRODUCTION

Polysiloxane elastomer materials are desirable in the cosmetic industry to thicken carrier fluids while imparting desirable sensory properties to cosmetics. Polysiloxane elastomers are crosslinked gel materials that can impart a smooth, dry, powdery feel desirable in many cosmetics while also thickening carrier fluids. Polysiloxane elastomers comprise a polysiloxane backbone crosslinked by polysiloxane crosslinkers.

There is interest in identifying elastomer materials that can provide similar sensory and thickening properties as polysiloxane elastomers but which also have a higher organic content. Increasing the organic content can increase compatibility with non-aqueous solvents, which can be desirable to increase versatility of formulations in which the elastomer is useful. In that regard, it is desirable to identify an elastomer with the thickening and sensory properties of polysiloxane elastomer materials but that comprise a siloxane-free backbone.

It is also desirable to increase the environmentally friendly nature of elastomers by, for example, decreasing hydrolytic stability of the elastomer so that it can break down more readily over time. Degradability, particularly between the backbone polymer and crosslinker, can facilitate breakdown of the polymer over time.

Cosmetics, which rely on polysiloxane elastomers for thickening and sensory properties, can further benefit from wash resistance so they stay in place once applied to the skin for a longer period of time. One way to help increase the durability of cosmetics is to identify elastomer gels can be processed into a paste with desirable sensory properties that are wash-resistant (durable).

It is desirable to identify an elastomer that provides similar thickening and sensory properties as a polysiloxane elastomer but with a non-siloxane backbone polymer that is connected to a crosslinker through a less hydrolytically stable bond than a carbon-oxygen-carbon linkage (C—O—C) and that has a durability to washing that is at least as good or better than polysiloxane elastomers.

BRIEF SUMMARY OF THE INVENTION

The present invention provides a solution to the problem of identifying an elastomer that provides similar thickening and sensory properties as a polysiloxane elastomer but with a non-siloxane backbone polymer that is connected to a crosslinker through a less hydrolytically stable bond than a carbon-oxygen-carbon (C—O—C) linkage and that has a durability to washing that is at least as good or better than polysiloxane elastomers.

The present invention is a result of discovering how to prepare elastomers with a polyester backbone that is free of siloxane linkages and that are crosslinked through carbon-oxygen-silicon linkages (C—O—Si), which are less hydrolytically stable than C—O—C linkages, can result in an elastomer with the aforementioned desired properties.

In a first aspect, the present invention is a composition comprising an elastomer, the elastomer characterized by having a polyester backbone crosslinked with a crosslinker and having a carbon-oxygen-silicon linkage between ester groups and crosslinkers.

In a second aspect, the present invention is a process for preparing the composition of any one previous Claim, the method comprising preparing the elastomer by: (a) providing a backbone polymer having at least two terminal unsaturated carbon-carbon bonds that are separated from any polyester group by a carbon-oxygen-silicon bond and a crosslinker material that contains multiple silylhydride groups provided that at least one of the backbone polymer or crosslinker has an average unsaturated carbon-carbon bond functionality of more than two and/or the crosslinker has an average silylhydride functionality of greater than two; and (b) crosslinking the backbone polymer with the crosslinker material by hydrosilylation addition between unsaturated carbon-carbon bonds of the backbone polymer and silylhydride groups of the crosslinker material to form an elastomer.

Elastomers of the present invention are useful as additives for cosmetics to achieve desired sensory character to the cosmetic, especially to achieve a smooth, dry, powdery feel while achieving durability with respect to wash resistance.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; END refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated.

"Unsaturated carbon-carbon bonds" can be carbon-carbon triple bonds, or preferably carbon-carbon double bonds (C=C).

In one aspect, the present invention is a composition comprising an elastomer. The composition can be the elastomer or can be a combination of components including the elastomer. Desirably, the composition is a solvent swollen gel comprising the elastomer swollen with a solvent (that is, a solvent swollen elastomer), typically a non-aqueous solvent. The solvent swollen elastomer can be in particulate form in solvent, especially non-aqueous solvent, so as to form a paste. A paste can be formed by subjecting a solvent-swollen elastomer gel to shear, typically while in excess solvent, to break the elastomer gel into particulates. The extent of shear can determine the particle size of the elastomer gel in the paste. Typically, the finer the particle size the smoother (less granular) the resulting paste feels so finer particle sizes are desirable in applications such as cosmetics that involve application to skin.

The solvent is desirably a non-aqueous solvent, and can be a non-polar solvent. The solvent can be, for example, any one or any combination of fluids selected from a group consisting of hydrocarbons, ethers, esters, alcohols, and siloxane fluids. Examples of suitable hydrocarbon fluids include farnesane, squalane, isohexadecane, undecane, tridecane and isododecane. Examples of suitable ether fluids include material sold under the name CETIOL™ OE from BASF (CETIOL is a trademark of Cognis IP Management GMBH), ethyl 3-(2,4-dimethyl-1,3-dioxolan-2-yl)propanoate, ethyl glycerin acetal levulinate, ethyl phenethyl acetal, and isopropylideneglyceryl cocoate. Examples of suitable ester fluids include isodecyl neopentanoate, isostearyl neopentanoate, isononyl isononanoate, ethyl acetate, capric triglyceride, caprylic triglyceride, triheptanoin, triisostearin, diisopropyl acetate, diisopropyl adipate, diisobutyl adipate, diethylhexyl adipate, n-propyl acetate, isobutyl acetate, n-butyl acetate, trimethylolpropane tricaprylate, trimethylolpropane tricaprate, dipentaerythrityl hexa C5-9 acid esters, C12-15 alkyl benzoate, triethylhexanoin, neopentyl glycol diheptanoate, diheptylsuccinate, heptylundecylenate, propylene glycol dibenzoate, dipropylene glycol dibenzoate, ethylhexyl palmitate, ethylhexyl stearate, isopropyl laurate, hexyl laurate, isopropyl myristate, isopropyl palmitate, n-butyl stearate, propylene glycol dicapiylate, propylene glycol dicaprate, coco caprylate, coco caprate, ethylhexyl cocoate, oleyl erucate, propylhelptyl caprylate, decyl oleate, hexyldecyl stearate, and propylene glycol laurate. Examples of suitable siloxane fluids include cyclic siloxanes such as cyclotetrasiloxane such as that available as DOWSIL™ 244 Fluid (DOWSIL is a trademark of The Dow Chemical Company), cyclopentasiloxane such as that available as DOWSIL™ 245 Fluid, or cyclohexasiloxane such as that available as DOWSIL™ 246 Fluid, linear and branched alkyl and aryl siloxanes such as caprylyl methicone such as that available as DOWSIL™ FZ-3196, and linear dimethylsiloxanes such as that available as DOWSIL™ 200 Fluids, and phenyl trimethicone such as that available as DOWSIL™ 556 Fluid. If the solvent includes a siloxane fluid it can also comprise an additional solvent. The solvent can also be free of siloxane.

The solvent can be a "high volatility" solvent selected from isododecane (boiling point of 210° C. at 101 MegaPascals pressure), farnesane (boiling point of 252° C. at 101 MegaPascals pressure), undecane (boiling point of 195° C. at 101 MegaPascals pressure), n-dodecane (boiling point of 216° C. at 101 MegaPascals pressure) and tridecane (boiling point of 234° C. at 101 MegaPascals pressure). These solvents form gels that can be turned into pastes having greater wash durability than pastes made from typical purely silicone elastomers.

The concentration of solvent in the solvent swollen elastomer composition is desirably 25 weight-percent (wt %) or more, preferably 30 wt % or more, 35 wt % or more, 40 wt % or more, 45 wt % or more, 50 wt % or more, 55 wt % or more, 60 wt % or more, 65 wt % or more 70 wt % or more, 75 wt % or more, even 80 wt % or more while at the same time is typically 85 wt % or less, 80 wt % or less, 75 wt % or less, 70 wt % or less, 65 wt % or less, 60 wt % or less, 55 wt % or less, 50 wt % or less, 45 wt % or less, 40 wt % or less, 35 wt % or less based on combined weight of solvent and elastomer.

The elastomer is a crosslinked polymer comprising a backbone polymer ("backbone") interconnected with other backbone polymers through crosslinker polymers ("crosslinkers"). Desirably, each backbone polymer has at least three bonds to crosslinkers and/or each crosslinker has at least three bonds to backbone polymers.

The backbone is a polyester, which is a molecule comprising multiple polyester groups. The backbone polyester can be free of siloxane (Si—O—Si) linkages between ester groups. The elastomer can comprise or be free of polysaccharide components.

The crosslinker bonds to the backbone through a linking group that comprises, and can be, a carbon-oxygen-silicon (C—O—Si) linkage. The linking group resides between an ester group in the backbone and the crosslinker. The crosslinker is typically a polysiloxane, which is a molecule comprising multiple Si—O—Si linkages.

Desirably, the elastomer comprises a backbone that is free is Si—O—Si linkages and that contains ester linkages and crosslinkers that contain Si—O—Si linkages. In such an elastomer the backbone is evident as the component between ester groups that is free of Si—O—Si linkages while the crosslinkers are evident as the component between C—O—Si linkages that contain Si—O—Si linkages. Desirably, at least one C—O—Si linkage resides between any polyester and any Si—O—Si linkage in the elastomer.

The backbone component of the elastomer can comprise or consist of a segment having any one or any combination of more than one of the chemical structures (I), (II), and (III) where the unbound bond indicated by "—" connects to a crosslinker:

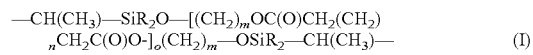
 (I)

 (II)

 (III)

where:
  R is independently in each occurrence selected from hydrocarbyl groups having from one to 8 carbon atoms, and can be all the same or can differ from one another. The hydrocarbyl groups can have one or more, two or more, three or more, four or more, 5 or more, 6 or more, even 7 or more while at the same time typically contain 8 or fewer, and can contain 7 or fewer, 6 or fewer, 5 or fewer, 4 or fewer, 3 or fewer, even 2 or fewer carbon atoms. Desirably, the R groups are selected from a group consisting of methyl, ethyl, propyl and phenyl groups.
  X is independently in each occurrence selected from —H, —C(O)—(CH$_2$)$_4$C(O)OH and —C(O)—(CH$_2$)$_4$C(O)OSiR$_2$—CH$_2$CH$_2$— where R is as described above provided at least two X group are —C(O)—(CH$_2$)$_4$C(O)OSiR$_2$—CH$_2$CH$_2$— groups.
  Subscript m independently in each occurrence has an average value in a range of one to 8, and preferably has a value of 2 or more and can have a value of 3 or more, 4 or more, 5 or more, 6 or more, even 7 or more, while at the same time typically has a value of 8 or less, 7 or less, 6 or less, 5 or less, 4 or less, 3 or less, even 2 or less. Desirably, subscript m is 2 in each occurrence.
  Subscript n has an average value in a range of 2 to 5. Subscript n can have a value of 2 or more, 3 or more, 4 or more, 5 or more, 10 or more, 15 or more, 20 or more, 25 or more, 30 or more, 35 or more, even 40 or more while at the same time typically has a value of 50 or less, 45 or less, 40 or less, 35 or less, 31 or less, 25 or less, 20 or less, 10 or less, even 5 or less.
  subscript o has an average value in a range of 2 to 10. Subscript o can have a value of 2 or more, 3 or more, 4 or more, 5 or more, 6 or more, 7 or more, 8 or more, even 9 or more, while at the same time typically has a value of 10 or less, 9 or less, 8 or less, 7 or less, 6 or less, 5 or less, 4 or less, even 3 or less.

The crosslinker segment of the elastomer can comprise or consist of any one or any combination of more than one of the following segments (IV) and (V); where "—" corresponds to a bond attaching to a carbon atom of the backbone and can correspond to the same bond designated by "—" in structure (I), (II) and (III):

$$(-(CH_3)_2SiO_{1/2})_2((CH_3)SiO_{2/2})_b \qquad (IV)$$

$$((CH_3)_3SiO_{1/2})_2((CH_3)_2SiO_{2/2})_c(-(CH_3)SiO_{2/2})_d \qquad (V)$$

where
- subscript b corresponds to the average number of $((CH_3)SiO_{2/2})$ groups per crosslinker segment having structure (IV) and typically has a value of 5 or more, and can have a value of 10 or more, 15 or more, even 16 or more while at the same time typically has a value of 30 or less, and can be 25 or less, 20 or less, even 17 or less;
- subscript c corresponds to the average number of $((CH_3)_2SiO_{2/2})$ groups per crosslinker segment having structure (V) and typically has a value of 2 or more and can be 3 or more, 5 or more, 10 or more, 15 or more, 20 or more, 25 or more, 30 or more, 40 or more, 50 or more, 60 or more, 70 or more, 80 or more, even 90 or more while at the same time typically is 100 or less, and can be 95 or less, 92 or less, 90 or less, 80 or less, 70 or less, 60 or less, 50 or less, 40 or less, 30 or less, 25 or less, 20 or less, 10 or less, even 5 or less; and
- subscript d corresponds to the average number of $(-(CH_3)SiO_{2/2})$ groups per crosslinker segment having structure (V) and typically has a value of 2 or more, and can be 3 or more, 4 or more, 5 or more, even 6 or more, while at the same time typically has a value of 10 or less, and can be 9 or less, 8 or less, 7 or less, even 6 or less.

In a second aspect, the present invention is a method for preparing the composition of the first aspect of the present invention. The method comprises preparing the elastomer of the first aspect by: (a) providing a backbone polymer having at least two terminal unsaturated carbon-carbon bonds that are separated from any polyester group by a carbon-oxygen-silicon bond and a crosslinker material that contains multiple silylhydride groups provided that at least one of the backbone polymer or crosslinker has an average unsaturated carbon-carbon bond functionality of more than two and/or the crosslinker has an average silylhydride functionality of greater than two; and (b) crosslinking the backbone polymer with the crosslinker material by hydrosilylation addition between unsaturated carbon-carbon bonds of the backbone polymer and silylhydride groups of the crosslinker material to form an elastomer. "Functionality" for the backbone polymer refers to terminal unsaturated carbon-carbon bonds and for the crosslinking material refers to silylhydride groups.

The backbone polymer is desirably an organosilyl-functional polyester comprising at least two organosilyl-functional groups with at least one terminal unsaturated carbon-carbon bond on each. "Organosilyl-functional" refers to having at least one —$SiR_3$ group, preferably multiple —$SiR_3$ groups, where each R is independently selected from hydrocarbyl groups including alkyl groups, alkenyl groups and aryl groups.

Examples of suitable oganosilyl-functional polyesters include any one or any combination of more than one organosilyl-functional polyester having an average chemical structure (VI), (VII) or (VIII):

$$CH_2=CH-SiR_2O-[(CH_2)_mOC(O)CH_2(CH_2)_nCH_2C(O)O-]_o(CH_2)_m-OSiR_2-CH=CH_2 \qquad (VI)$$

$$C(R)[CH_2OX]_3 \qquad (VII)$$

$$CH_3CH(OX)CH_2CH_2OX \qquad (VIII)$$

where:
- R is independently in each occurrence selected from hydrocarbyl groups having from one to 8 carbon atoms, and can be all the same or can differ from one another. The hydrocarbyl groups can have one or more, two or more, three or more, four or more, 5 or more, 6 or more, even 7 or more while at the same time typically contain 8 or fewer, and can contain 7 or fewer, 6 or fewer, 5 or fewer, 4 or fewer, 3 or fewer, even 2 or fewer carbon atoms. Desirably, the R groups are selected from a group consisting of methyl, ethyl, propyl and phenyl groups.
- X is independently in each occurrence selected from —H, —C(O)—$(CH_2)_4$C(O)OH and —C(O)—$(CH_2)_4$C(O)OSiR_2—CH=CH_2 where R is as described above provided at least two X group are —C(O)—$(CH_2)_4$C(O)OSiR_2—CH=CH_2 groups.
- Subscript m independently in each occurrence has an average value in a range of one to 8, and preferably has a value of 2 or more and can have a value of 3 or more, 4 or more, 5 or more, 6 or more, even 7 or more, while at the same time typically has a value of 8 or less, 7 or less, 6 or less, 5 or less, 4 or less, 3 or less, even 2 or less. Desirably, subscript m is 2 in each occurrence.
- Subscript n has an average value in a range of 2 to 5. Subscript n can have a value of 2 or more, 3 or more, 4 or more, 5 or more, 10 or more, 15 or more, 20 or more, 25 or more, 30 or more, 35 or more, even 40 or more while at the same time typically has a value of 50 or less, 45 or less, 40 or less, 35 or less, 31 or less, 25 or less, 20 or less, 10 or less, even 5 or less.
- subscript o has an average value in a range of 2 to 10. Subscript o can have a value of 2 or more, 3 or more, 4 or more, 5 or more, 6 or more, 7 or more, 8 or more, even 9 or more, while at the same time typically has a value of 10 or less, 9 or less, 8 or less, 7 or less, 6 or less, 5 or less, 4 or less, even 3 or less.

The oganosilyl-functional polyester desirably has a Mw in a range of 1000 to 5000 grams per mole (g/mol), preferably 1200 to 2500, and can be in a range of 1400 to 2300. Determine molecular weight for organosilyl-functional polyesters using gel permeation chromatography using a Waters 2695 Separation Module with a vacuum degasser and a Waters 2410 differential refractometer. Use two (300 millimeter by 7.5 millimeter) Polymer Laboratories PLgel 5 micrometers Mixed-C columns (molecule weight separation range of 200-2,000,000), preceded by a PLgel 5 micrometer guard column (50 millimeters by 7.5 millimeters). Use certified grade tetrahydrofuran (THF) for polyester samples and toluene for crosslinker samples flowing at 1.0 milliliters per minute as the eluent while maintaining the column and detector at 35° C. Prepare polyester samples in THF and crosslinker samples in toluene at approximately 0.15 volume-percent concentration and allow to solvate for two hours with occasional shaking and filter through a 0.45 micrometer polytetrafluoroethylene syringe filter prior to analysis. Inject 100 microliters of sample for analysis and collect data for 30 minutes. Collect data and conduct analysis using ThermoLabsystems Atlas chromatography software and Polymer Laboratories Cirrus GPC software.

Molecular weight averages are relative to a calibration curve (3$^{rd}$ order) created suing polystyrene standards covering the molecular weight range of 580 to 2,750,000.

The crosslinker material is a silylhydride -functional (SiH-functional) compound, preferably a SiH-functional polysiloxane. The crosslinker material contains at least two SiH functionalities. The SiH-functional polysiloxane can be branched or linear, but is preferably linear. The SiH-functional polysiloxane can have one or more than one terminal SiH group while being free of pendant SiH groups, can have one or more than one pendant SiH group while being free of terminal SiH groups, or can have a combination of one or more terminal SiH group and one or more pendant SiH group.

Desirably, the SiH functional polysiloxane is linear and is one or any combination of more than one compound selected from those having the following average chemical formula:

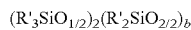

(R'$_3$SiO$_{1/2}$)$_2$(R'$_2$SiO$_{2/2}$)$_b$ where:
R' is independently in each occurrence selected from a group consisting of hydrogen and R groups where R is as described above, provided at least two R' groups are hydrogen;
Subscript b is the average number of (R'$_2$SiO$_{2/2}$) group per molecule and typically has a value of 5 or more, and can be 10 or more, 15 or more, 20 or more, 30 or more, 50 or more, 70 or more, even 90 or more while at the same time is typically 120 or less, even 100 or less and can be 70 or less, 50 or less, 30 or less, 20 or less, 15 or less, even 10 or less.

Examples of suitable silylhydride-functional polysiloxanes include those having the following average molecular formulae:

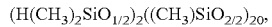

(H(CH$_3$)$_2$SiO$_{1/2}$)$_2$((CH$_3$)SiO$_{2/2}$)$_{20}$,

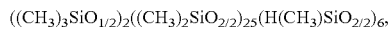

((CH$_3$)$_3$SiO$_{1/2}$)$_2$((CH$_3$)$_2$SiO$_{2/2}$)$_{25}$(H(CH$_3$)SiO$_{2/2}$)$_6$,

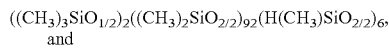

((CH$_3$)$_3$SiO$_{1/2}$)$_2$((CH$_3$)$_2$SiO$_{2/2}$)$_{92}$(H(CH$_3$)SiO$_{2/2}$)$_6$, and

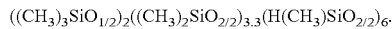

((CH$_3$)$_3$SiO$_{1/2}$)$_2$((CH$_3$)$_2$SiO$_{2/2}$)$_{3.3}$(H(CH$_3$)SiO$_{2/2}$)$_6$.

When present, the silylhydride-functional polysiloxanes are desirably present at a concentration sufficient to provide a molar ratio of SiH functionality from the crosslinker material to unsaturated carbon-carbon bonds from the backbone polymer that is 0.7 or more, preferably 0.90 or more while at the same time is typically 1.5 or less, preferably 1.0 or less, even more preferably 0.95 or less.

Form the elastomer of the first aspect of the invention by crosslinking the backbone polymer with the crosslinker material by hydrosilylation addition between unsaturated carbon-carbon bonds of the backbone polymer and silylhydride groups of the crosslinker material.

Typically, it is desirable to run the hydrosilylation reaction in the presence of a hydrosilylation catalyst. Typically, the hydrosilylation catalyst is any one or any combination of more than one platinum-based hydrosilylation catalyst. Platinum-based hydrosilylation catalysts include compounds and complexes such as platinum (0)-1,3-divinyl-1,1,3,3-tetramethyldisiloxane (Karstedt's catalyst), H$_2$PtCl$_6$, di-μ.-carbonyl di-.π.-cyclopentadienyldinickel, platinum-carbonyl complexes, platinum-divinyltetramethyldisiloxane complexes, platinum cyclovinylmethylsiloxane complexes, platinum acetylacetonate (acac), platinum black, platinum compounds such as chloroplatinic acid, chloroplatinic acid hexahydrate, a reaction product of chloroplatinic acid and a monohydric alcohol, platinum bis(ethylacetoacetate), platinum bis(acetylacetonate), platinum dichloride, and complexes of the platinum compounds with olefins or low molecular weight organopolysiloxanes or platinum compounds microencapsulated in a matrix or core-shell type structure. The hydrosilylation catalyst can be part of a solution that includes complexes of platinum with low molecular weight organopolysiloxanes that include 1,3-diethenyl-1,1,3,3-tetramethyldisiloxane complexes with platinum. These complexes may be microencapsulated in a resin matrix. The catalyst can be 1,3-diethenyl-1,1,3,3-tetramethyldisiloxane complex with platinum.

The concentration of platinum-based hydrosilylation catalyst is typically 5 weight-parts per million (ppm) or more, preferably 10 ppm or more, and can be 25 ppm or more, 50 ppm or more, even 75 ppm or more while at the same time is typically 500 ppm or less, 400 ppm or less, 300 ppm or less, 200 ppm or less and preferably 100 ppm or less and can be 90 ppm or less, 80 ppm or less, 70 ppm or less, 60 ppm or less, even 50 ppm or less based on the combined weight of crosslinker material and backbone polymer.

It is desirable to run the hydrosilylation reaction in a non-aqueous solvent to produce a solvent-swollen elastomer. Examples of suitable solvents include the solvents described hereinabove, including non-polar solvents. Desirably, when the solvent is a polysiloxane and the oganosilyl-functional polyester contains more than 2 terminal carbon-carbon double bonds then the molecular weight of the crosslinker is less than 7500, and can have a molecular weight of 7400 or less, and preferably has a molecular weight of 2400 or less, even 2390 or less, more preferably 1400 or less, even 1390 or less. Determine molecular weight of the crosslinker material using the method as described hereinabove for the oganosilyl-functional polyester.

The method can comprise forming a solvent-swollen elastomer as described and then subjecting the solvent-swollen elastomer to shear to break the solvent swollen elastomer into particulate form to produce a paste. Optionally, non-aqueous solvent can be added to the solvent-swollen elastomer before, during and/or after subjecting the solvent-swollen elastomer to shear. In the broadest scope, there is no limitation on how to subject the solvent-swollen elastomer to shear. For example, mixing the solvent-swollen elastomer with a mixing blade can apply shear to break up the solvent-swollen elastomer into particulate form. The extent of shear can determine the particle size of the elastomer gel in the paste. Typically, the finer the particle size the smoother (less granular) the resulting paste feels so finer particle sizes are desirable in applications such as cosmetics that involve application to skin.

EXAMPLES

Prepare backbone polymers according to the following methods and then prepare samples of Examples (Exs) and Comparative Examples (CExs) of the present invention according to the subsequent procedures below.

Preparation of Organosilyl-Functional Polyesters Backbone Polymers

Table 1 lists the components for preparing the following examples.

TABLE 1

| Component | Description | Source |
|---|---|---|
| Polyester 1 | HO—[(CH$_2$)$_2$OC(O)CH$_2$(CH$_2$)$_{31}$CH$_2$C(O)O—]$_{3.9}$(CH$_2$)$_2$—OH with an Mw of 2000 g/mol. | Available from Croda under the name PRIPLAST™ 3238. |
| Polyester 2 | HO—[(CH$_2$)$_2$OC(O)CH$_2$(CH$_2$)$_{13}$CH$_2$C(O)O—]$_{7.5}$(CH$_2$)$_2$—OH with an Mw of 2000 g/mol. | Available from Croda under the name PRIPLAST™ 3294. |
| Polyester 3 | Reaction product of adipic acid with trimethylolpropane and 1,3-butanediol in molar ratio of approximately 2:1.3:1 respectively. Average Mw is 1430 g/mol. | Available from Covestro under the name DESMOPHEN™ 1100. |
| Divinyl Disilazane | 1,1,3,3-tetramethyl-1,3-divinyldisilazane | From Sigma-Aldrich. |
| Catalyst | Saccharine | From Sigma-Aldrich. |

PRIPLAST is a trademark of Croda International PLC. DESMOPHEN is a trademark of Covestro Intellectual property GMBH.

Table 2 provides concentrations of polyester polyol, catalyst and divinyl disilazane used to prepare each organosilyl-functional polyesters in grams as well as reaction time (hours) and reaction temperature (° C.) for each of Organosilyl-Functional Polyester 1-3. Additionally, Table 2 lists average mole-percent (mol %) OH substitution (silylation) relative to moles OH in polyester polyol, wt % vinyl groups per molecule based on organosilyl-functional polyester weight, and average number of vinyl groups per organosilyl-functional polyester molecule.

TABLE 2

| Organosilyl-Functional Polyester | Polyester Polyol Identity | Polyester Polyol (g) | Catalyst (g) | Divinyl Disilazane (g) | Temp (° C.) | Time (Hrs) | Mol % OH Substitution | Wt % Vinyl | Vinyl Groups per Molecule |
|---|---|---|---|---|---|---|---|---|---|
| 1 | 1 | 75 | 0.035 | 10.4 | 110 | 4 | 95 | 2.5 | 2 |
| 2 | 2 | 50 | 0.023 | 6.95 | 110 | 6 | 100 | 2.5 | 2 |
| 3 | 3 | 50 | 0.009 | 35.5 | 110 | 6 | 80 | 7.8 | 4 |

Add the polyester polyol, divinyl disilazane and catalyst to a 500 milliliter (mL) round bottom flask. Add a polytetrafluoroethylene stir bar and purge the flask and contents with nitrogen, sealing with a septum. Heat the contents using a heating plate to the reaction temperature while stirring for the reaction time. Allow the mixture to cool to 23° C. and remove residual divinyl disilazane under vacuum (1.3 kilopascals) at 130° C. for 2 hours to obtain the resulting organosilyl-functional polyester.

Characterize the resulting organosilyl-functional polyester by proton ($^1$H) nuclear magnetic resonance (NMR) spectroscopy. Dissolve a 10 milligram sample of organosilyl-functional polyester in 0.6 milliliters of deuterated benzene (d6-benzene) and analyze using a 400 Megahertz Varian $^1$H NMR spectrometer. Use a 5 second acquisition time and a relaxation delay time of 15 seconds. Collect 16 scans and average to get resulting spectrum. Reference resulting spectrum to benzene at δ 7.16 ppm. Regions for the groups of interest in the spectra are: vinyl region ("V") integrated from δ 5.6-6.5 ppm; methylene region adjacent to hydroxyl ("O") integrated over δ 4.2-4.3 ppm to determine hydroxyl substitution. δ 2.1-2.3 ppm to account for methylene rejection adjacent to ester region ("E") and methyl region at δ 0.15-0.3 ppm to account for silylation ("S"). Set integration based on number of repeat units along backbone of polyester polymer: for Polyester 1 normalize region "E" to 16; for Polyester 2 normalize region "E" to 30, and for Polyester 3 normalize region "E" to 24. Calculate mol % OH substitution as the integration from the region corresponding to "V" divided by the theoretical vinyl integration based on the OH per polyester polyol. The theoretical vinyl integration Polyester 1 and 2 is 6 and Polyester 3 is 16.5. Use the following calculations:

Mol % OH Substitution=[(V)/(OH per polyester poly)*3]*100%

Wt % Vinyl=[molecular weight of vinyl group]*[Mol % OH Substitution]/[MW/OH of Polyester]where MW/OH of Polyester1and 2 is 1000and Polyester3 is 260.

Vinyl Groups per Polyester=[Mol % OH substitution]*[OH per Polyester]where OH per polyester is 2for Polyesters1and 2and is 5.5for Polyester3.

Organosilyl-Functional Polyester 1 has an average chemical structure:

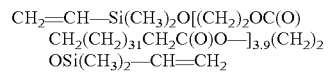

CH$_2$=CH—Si(CH$_3$)$_2$O[(CH$_2$)$_2$OC(O)CH$_2$(CH$_2$)$_{31}$CH$_2$C(O)O—]$_{3.9}$(CH$_2$)$_2$OSi(CH$_3$)$_2$—CH=CH$_2$

Organosilyl-Functional Polyester 2 has an average chemical structure:

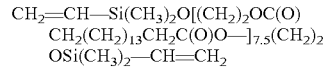

CH$_2$=CH—Si(CH$_3$)$_2$O[(CH$_2$)$_2$OC(O)CH$_2$(CH$_2$)$_{13}$CH$_2$C(O)O—]$_{7.5}$(CH$_2$)$_2$OSi(CH$_3$)$_2$—CH=CH$_2$

Organosilyl-Functional Polyester 3 can have a combination of structures but is expected to include material with the following average chemical structure:

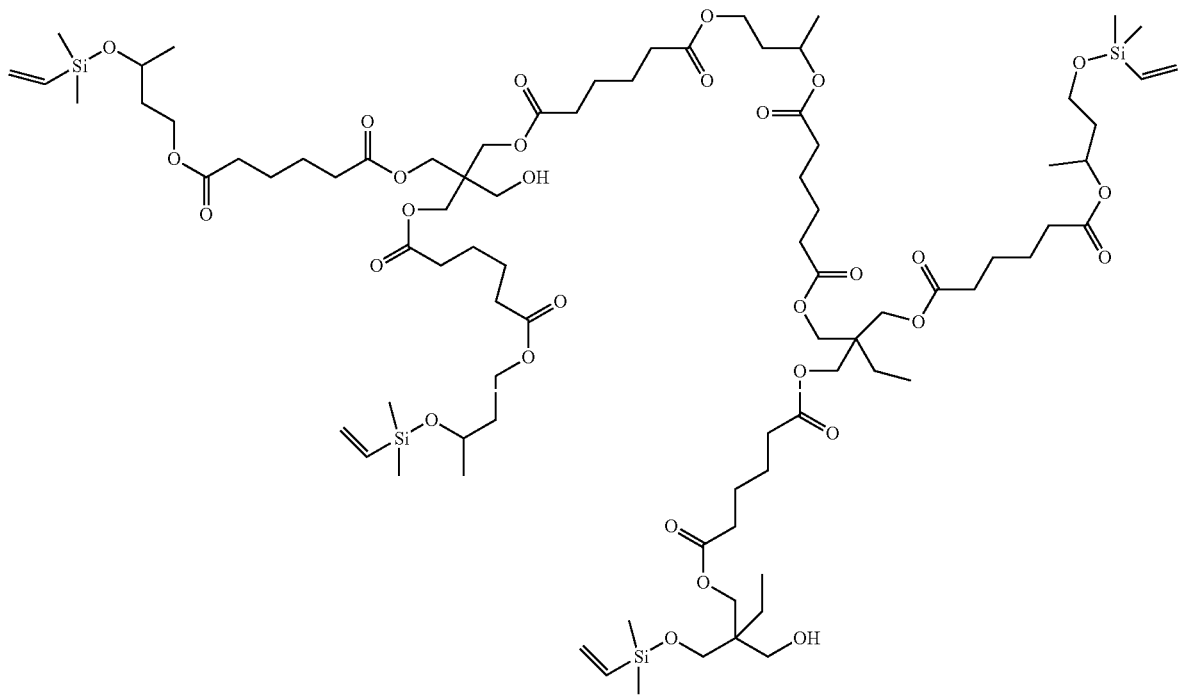 [SMILES: C=C[Si](C)(C)OCCC(C)OC(=O)CCCCC(=O)OCC(CC)(COC(=O)CCCCC(=O)OCC(CC)(CO)CO[Si](C)(C)C=C)COC(=O)CCCCC(=O)OC(C)CCOC(=O)CCCCC(=O)OCC(CO)(COC(=O)CCCCC(=O)OCCC(C)O[Si](C)(C)C=C)COC(=O)CCCCC(=O)OCCC(C)O[Si](C)(C)C=C]

Preparation of Exs and CExs

Table 3 lists the components to make the following Examples (Exs) and Comparative Examples (CExs).

TABLE 3

| Component | Description | Source |
|---|---|---|
| Organosilyl-Functional Polyester 1 | (see above) | Prepare as described above. |
| Organosilyl-Functional Polyester 2 | (see above) | Prepare as described above. |
| Organosilyl-Functional Polyester 3 | (see above) | Prepare as described above. |
| Crosslinker 1 | Average chemical formula: $H(CH_3)_2SiO[(CH_3)_2SiO]_{20}Si(CH_3)_2H$ with an average weight average molecular weight of 1360. | Prepare according to U.S. Pat. No. 4,370,358 (see columns 4-5). |
| Crosslinker 2 | Average chemical formula: $(CH_3)_3SiO[(CH_3)_2SiO]_{25}[H(CH_3)SiO]_6Si(CH_3)_3$ with an average weight average molecular weight of 2390. | Prepare according to U.S. Pat. No. 2,823,218 (see column 3). |
| Crosslinker 3 | Average chemical formula: $(CH_3)_3SiO[(CH_3)_2SiO]_{92}[H(CH_3)SiO]_6Si(CH_3)_3$ with an average weight average molecular weight of 7400. | Prepare according to U.S. Pat. No. 2,823,218 (see column 3). |
| Crosslinker 4 | Average chemical formula: $(CH_3)_3SiO[(CH_3)_2SiO]_{3.3}[H(CH_3)SiO]_6Si(CH_3)_3$ with an average weight average molecular weight of 780. | Prepare according to U.S. Pat. No. 2,823,218 (see column 3). |
| Solvent 1 | Proprietary blend of undecane and tridecane | Available under the name CETIOL ™ Ultimate from BASF. |
| Solvent 2 | Hemisqualane: $CH_3CH(CH_3)(CH_2)_3CH(CH_3)(CH_2)_3CH(CH_3)CH_3$ | Available from Aprinova |
| Solvent 3 | Caprylic/capric triglyceride | Available under the name CRODAMOL ™ GTCC from Croda, Inc. |
| Solvent 4 | Isododecane | Available from Lanxess |
| Solvent 5 | Isodecyl Neopentanoate | Available from Ashland |
| Solvent 6 | Polydimethylsiloxane having average kinematic viscosity of 5 square millimeters per second. | Available under the name DOWSIL ™200 Fluid from The Dow Chemical Company. |

TABLE 3-continued

| Component | Description | Source |
|---|---|---|
| Solvent 7 | decamethylcyclopentasiloxane | Available from Sigma-Aldrich. |
| Hydrosilylation Catalyst | 1,3-diethenyl-1,1,3,3-tetramethyldisiloxane platinum complex | Available under the name SYL-OFF ™ 4000 Catalyst from The Dow Chemical Company. |

CETIOL is a trademark of Cognis IP Management GMBH. CRODAMOL is a trademark of Croda, Inc. CERAPHYL is a trademark of ISP Investments, Inc. DOWSIL is a trademark of The Dow Chemical Company. SYL-OFF is a trademark of Dow Silicones Corporation.

Prepare elastomer samples using the following hydrosilylation procedure. The identify and concentration in grams ("[g]") in grams of each component is in Table 4. Combine the Organosilyl-Functional Polyester ("OFP"), Crosslinker and solvent in a 20 milliliter glass scintillation vial equipped with a magnetic stir bar and stir the components at 250 revolutions per minute form a mixture. Heat the mixture to the reaction temperature indicated in Table 4 and then add the Hydrosilylation Catalyst at the concentration indicated in Table 4 as weight-parts per million weight-parts mixture. Maintain the mixture at the reaction temperature for 3 hours and then allow to cool to 25° C.

Successful formation of a solvent-swollen elastomer (Rxn Success=Y) is evident if the reaction product flows one centimeter or less in a scintillation vial when inverted for one minute.

Table 4 reports the identity of each component, amount of each component, molar ratio of silylhydride to carbon-carbon double bonds (SiH:C═C), reaction temperature (Temp), and whether successful formation of a solvent-swollen elastomer occurred.

CEx A reveals that when the backbone polymer has an average of two unsaturated carbon-carbon bonds and the crosslinker material has an average of two SiH groups then the reaction fails to cure to an elastomer. However, other examples reveal that as long as either the backbone polymer or crosslinker material has an average of more than two functionalities then the other can have two and the reaction will form an elastomer.

Exs 26-39 and CEx B and CEx C illustrate that when using a polysiloxane solvent with an oganosilyl-functional polyester having more than 2 terminal carbon-carbon double bonds then it is desirable to use a crosslinker having a molecular weight below 7400.

TABLE 4

| | VFP | | Crosslinker | | Solvent | | | Temp | [catalyst] | Rxn |
|---|---|---|---|---|---|---|---|---|---|---|
| Sample | Identity | [g] | Identity | [g] | Identity | [g] | SiH:C═C | (° C.) | (ppm) | Success |
| Ex 1 | 3 | 0.11 | 1 | 0.19 | 2 | 0.70 | 0.90 | 100 | 20 | Y |
| Ex 2 | 3 | 0.11 | 1 | 0.19 | 3 | 0.70 | 0.90 | 100 | 20 | Y |
| Ex 3 | 1 | 0.49 | 3 | 0.51 | 2 | 2.8 | 0.95 | 70 | 20 | Y |
| Ex 4 | 2 | 0.49 | 3 | 0.51 | 2 | 2.98 | 0.95 | 70 | 20 | Y |
| Ex 5 | 1 | 0.24 | 3 | 0.26 | 3 | 1.49 | 0.95 | 70 | 20 | Y |
| Ex 6 | 2 | 0.24 | 3 | 0.26 | 3 | 1.49 | 0.95 | 70 | 20 | Y |
| Ex 7 | 1 | 0.49 | 3 | 0.51 | 2 | 3.99 | 0.95 | 70 | 10 | Y |
| Ex 8 | 1 | 0.75 | 2 | 0.25 | 2 | 3.99 | 0.95 | 70 | 10 | Y |
| Ex 9 | 1 | 0.90 | 4 | 0.10 | 2 | 3.99 | 0.95 | 70 | 10 | Y |
| Ex 10 | 1 | 0.75 | 2 | 0.25 | 2 | 3.97 | 0.95 | 95 | 30 | Y |
| Ex 11 | 1 | 0.90 | 4 | 0.10 | 2 | 3.97 | 0.95 | 95 | 30 | Y |
| Ex 12 | 1 | 4.77 | 3 | 5.23 | 1 | 39.81 | 0.95 | 70 | 20 | Y |
| Ex 13 | 1 | 0.30 | 2 | 0.10 | 2 | 0.93 | 0.95 | 95 | 30 | Y |
| Ex 14 | 1 | 0.20 | 3 | 0.20 | 2 | 0.93 | 0.95 | 95 | 30 | Y |
| Ex 15 | 1 | 0.36 | 4 | 0.04 | 2 | 1.59 | 0.95 | 95 | 30 | Y |
| Ex 16 | 1 | 6.98 | 4 | 0.82 | 1 | 31.1 | 0.95 | 70 | 20 | Y |
| Ex 17 | 1 | 0.75 | 2 | 0.25 | 1 | 2.98 | 0.95 | 75 | 40 | Y |
| Ex 18 | 1 | 0.49 | 3 | 0.51 | 1 | 2.98 | 0.95 | 75 | 20 | Y |
| Ex 19 | 1 | 0.49 | 3 | 0.51 | 4 | 2.98 | 0.95 | 75 | 20 | Y |
| Ex 20 | 1 | 0.49 | 3 | 0.51 | 5 | 2.98 | 0.95 | 75 | 20 | Y |
| Ex 21 | 2 | 0.90 | 4 | 0.10 | 2 | 2.98 | 0.95 | 85 | 20 | Y |
| Ex 22 | 3 | 0.36 | 1 | 0.64 | 1 | 2.98 | 0.90 | 95 | 20 | Y |
| Ex 23 | 1 | 0.49 | 3 | 0.51 | 6 | 2.98 | 0.95 | 95 | 20 | Y |
| Ex 24 | 2 | 0.49 | 3 | 0.51 | 1 | 2.98 | 0.95 | 85 | 20 | Y |
| Ex 25 | 1 | 0.25 | 3 | 0.37 | 1 | 2.98 | 0.95 | 95 | 20 | Y |
| Ex 26 | 3 | 0.23 | 3 | 0.77 | 1 | 2.98 | 0.95 | 95 | 20 | Y |
| Ex 27 | 3 | 0.23 | 3 | 0.77 | 1 | 3.00 | 0.95 | 95 | 5 | Y |
| Ex 28 | 3 | 0.74 | 4 | 0.26 | 1 | 3.00 | 0.95 | 95 | 20 | Y |
| Ex 29 | 3 | 0.23 | 3 | 0.77 | 4 | 2.98 | 0.95 | 85 | 20 | Y |
| Ex 30 | 3 | 0.23 | 3 | 0.77 | 2 | 2.98 | 0.95 | 85 | 20 | Y |
| Ex 31 | 1 | 0.49 | 3 | 0.51 | 1 | 2.99 | 0.95 | 95 | 5 | Y |
| Ex 32 | 3 | 3.27 | 3 | 10.73 | 1 | 55.73 | 0.95 | 85 | 10 | Y |
| Ex 33 | 3 | 3.27 | 3 | 10.73 | 2 | 55.73 | 0.95 | 85 | 20 | Y |
| Ex 34 | 2 | 5.48 | 3 | 5.72 | 5 | 58.67 | 0.95 | 85 | 10 | Y |
| Ex 35 | 2 | 3.77 | 3 | 3.93 | 5 | 62.17 | 0.95 | 85 | 10 | Y |
| Ex 36 | 2 | 0.63 | 3 | 0.37 | 7 | 2.98 | 0.95 | 95 | 20 | Y |
| Ex 37 | 1 | 0.51 | 3 | 0.50 | 6 | 3.02 | 0.95 | 85 | 20 | Y |
| Ex 38 | 3 | 0.35 | 1 | 0.65 | 6 | 3.0 | 0.95 | 85 | 20 | Y |

TABLE 4-continued

| Sample | VFP Identity | [g] | Crosslinker Identity | [g] | Solvent Identity | [g] | SiH:C=C | Temp (° C.) | [catalyst] (ppm) | Rxn Success |
|---|---|---|---|---|---|---|---|---|---|---|
| Ex 39 | 2 | 0.48 | 3 | 0.52 | 6 | 3.0 | 0.95 | 85 | 20 | Y |
| CEx A | 2 | 0.63 | 1 | 0.37 | 7 | 2.98 | 0.95 | 95 | 20 | N |
| CEx B | 3 | 0.23 | 3 | 0.79 | 6 | 3.09 | 0.95 | 95 | 40 | N |
| CEx C | 3 | 0.23 | 3 | 0.79 | 7 | 3.04 | 0.95 | 65 | 40 | N |

Paste Samples

Prepare pastes from the Example materials above by subjecting them to shear using a Waring model 7012 blender. For Paste 1 and Paste 2 gradually add solvent while applying shear. Table 5 identifies exemplary compositions for making the pastes and identifies which Example material to use, how much (in grams), which solvent to add and how much (in grams), resulting solids concentration as a wt % relative to paste weight, and final paste viscosity in milliPascals*seconds (mPa*s). Determine paste viscosity using a Brookfield DV-II Plus Pro Programmable Viscometer with a helipath spindle (S94) at 2.5 revolutions per minute at 25° C.

TABLE 5

| | Sample Composition | | Solvent | | Paste Solids | Paste Viscosity |
|---|---|---|---|---|---|---|
| Paste | Identity | (g) | Identity | (g) | (wt %) | (mPa*s) |
| 1 | Ex 16 | 36.7 | 1 | 8.3 | 16.3 | 310,000 |
| 2 | Ex 12 | 48.0 | 1 | 25.7 | 13.2 | 295,000 |
| 3 | Ex 32 | 65.0 | N/A | 0.0 | 20.0 | 246,000 |
| 4 | Ex 35 | 65.0 | N/A | 0.0 | 11.6 | 700,000 |

Sensory Feel

Characterize the sensory feel of the Paste samples as well as for two commercially available dimethicone materials available from The Dow Chemical Company under the tradenames DOWSIL™ 9041 (Ref 1) and DOWSIL™ 3901 (Ref 2). Ref 1 serves as a siloxane material with a desirable sensory feel profile. Ref 2 is a siloxane material with an undesirable sensory feel profile.

Conduct sensory feel evaluation using a panel of 10 trained sensory evaluators. Prior to evaluation, panelist washed their forearms, hands, and fingers with 4.3% active sodium lauryl ether sulfate in water and then rinsed with distilled water and dried with paper towels. For evaluation, each panelist applies 50 milligrams of a sample material to the inside of their forearm with a circular motion at a rate of 2 rubs per second for a maximum of 120 rubs. Panelists characterize the skin sensory parameters noted below on a scale of 1-5 with 5 being most like the parameter descriptor and 1 being least like the parameter descriptor. Each sample is assigned final value that is the average of the 10 trained sensory evaluator's values for each parameter. The parameters and descriptors are:

| Parameter | Descriptor |
|---|---|
| Smoothness | An even surface film with uniformity of texture. Value of 1 proximates the feel of sand while a value of 5 proximates the feel of talc. |
| Powderiness | A dry, soft, smooth slippery feel. Value of 1 proximates petrolatum and a value of 5 proximates talc. |
| Greasiness | A tacky dense coating associated with drag. Value of 1 proximates talc and a value of 5 proximates petrolatum. |
| Tackiness | Stickiness or the degree to which the finger sticks to the skin. A value of 1 proximates untreated skin and a value of 5 proximates lanolin. |
| Wetnesss | Amount of liquid perceived after 10 rubs. A value of 1 proximates talc and a value of 5 proximates mineral oil. |

For a "smooth, dry, powdery feel" it is desirable for the sample to have a Smoothness value of greater than 3, a Powderiness value of greater than 2, and a Wetness value of less than 3. Table 6 provides the sensory evaluation results for Pastes 1-4, Ref 1 and Ref 2. The results indicate the pastes of the present invention succeed in achieving a desirably "smooth, dry, powdery feel" similar to the standard siloxane material of Ref 1 and in contrast to Ref 2.

TABLE 6

| Sample | Smoothness | Powderiness | Greasiness | Tackiness | Wetness |
|---|---|---|---|---|---|
| Ref 1 | 3.8 | 3.0 | 2.3 | 1.4 | 1.7 |
| Paste 1 | 3.9 | 2.4 | 3.2 | 2.7 | 2.3 |
| Paste 3 | 4.1 | 2.5 | 2.8 | 1.8 | 2.1 |
| Paste 4 | 3.9 | 2.4 | 3.2 | 2.2 | 1.8 |
| Ref 2 | 4.8 | 1.5 | 3.6 | 1.7 | 4.7 |

Durability

Evaluate Durability for the Pastes according to the following procedure. Prepare samples in a dental cup by adding 8 g of a sample paste, then 2 g of Skolar Glare™ violet SG-7661E pigment (from CQV Co. Ltd., Skolar Glare is a trademark of CQV Co. Ltd.). Mix using a FlackTek DAC 150 speed mixer at 2000 revolutions per minute for 20 seconds. Coat 0.3 g of the resulting mixture onto a 4.75 centimeter by 5 centimeters collagen covered microscope slide. Allow the coating sample to dry at 25° C. for 24 hours. Wash the coated slide by applying a solution of 0.07 g of DIAL™ dish soap (Henkel Corporation) in 0.07 g water to the coated slide with a wet fingertip for 20 seconds. Take a digital image of the slide after washing and analyze using Image J software to determine the area of the slide where coating remains. Report the area of coating remaining as a percentage of the area originally coated and that is the Durability percentage for the sample. Higher values are more desirable for durability. Table 7 reports Durability percentages for the samples.

TABLE 7

| Sample | Durability % |
|---|---|
| Ref 1 | 0 |
| Paste 1 | 100 |
| Paste 2 | 63 |
| Paste 3 | 90 |
| Paste 4 | 70 |
| Ref 2 | 25 |

The data in Table 7 reveals that pastes of the present invention have greater durability than either of the siloxane reference materials. That is desirable the paste has a greater likelihood of remaining on the skin and providing the desired sensory feel even after washing.

Solvent Compatibility

Evaluate the solvent compatibility of the samples by combining in a dental cup 7.5 g of sample and 2.5 g of specified solvent (see Table 8) and then mix using a Flack-Tek DAC 150 speed mixer at 2300 revolutions per minute for 30 seconds. Transfer the material to a 20 milliliter clear, glass vial and centrifuge at 3000 revolutions per minute for 20 minutes using an IEC Model K centrifuge. Allow samples to set still at 25° C. for 24 hours and then observe the samples and characterize them using the following scale where lower values are better:

1: Clear. Sample is free of haze and one can easily read through it when text is place behind the vial containing sample.
2: Slightly Hazy. Sample is nearly clear, very slight haze is detectable and one can still easily read through the sample when text is placed behind the vial containing sample
3: Hazy. Sample is not clear and one can detect but not read text placed behind the vial containing the sample.
4: Opaque. White solid. Light cannot pass through and one cannot detect what is placed behind the vial.
5: Not Compatible. The sample phase separated.

Results for the sample materials are in Table 8. The data reveals that the pastes of the present invention generally have broader solvent compatibility than either Ref 1 or Ref 2.

TABLE 8

| Solvent | Ref 1 | Paste 1 | Paste 2 | Paste 3 | Paste 4 | Ref 2 |
|---|---|---|---|---|---|---|
| Solvent 3 | 3 | 2 | 3 | 3 | 1 | 2 |
| Ethylenemethoxy cinnamate | 5 | 1 | 2 | 3 | 1 | 3 |
| C12-15 Alkyl Benzoate | 3 | 3 | 3 | 3 | 1 | 2 |
| Sunflower Oil | 4 | 1 | 3 | 5 | 2 | 5 |
| PMX-200 silicone fluid, 2 cSt | 2 | 5 | 5 | 4 | 3 | 1 |
| Ethanol | 5 | 5 | 4 | 3 | 2 | 5 |
| PPG-3 Myristyl Ether | 3 | 3 | 3 | 3 | 1 | 2 |

Hydrolytic Stability

Evaluate the relative hydrolytic stability of a C—O—Si bond to C—O—C bond in Organosilyl-Functional Polyester 1. Place 15 milligrams of Organosilyl-Functional Polyester 1 into a glass nuclear magnetic resonance (NMR) tube and add 0.75 milliliters of deuterated chloroform (CDCl$_3$). Then add 5 microliters of a 10:1 mixture of deionized water/trifluoroacetic acid mixture. Collect proton NMR spectra at immediately and at 5 and 25 hours after adding the water/acid mixture. Collect NMR spectra using a 400 Megahertz Varian $^1$H NMR spectrometer. Us a 5 second acquisition time and a relaxation delay time of 15 seconds. Collect 16 scans and average to get a final spectrum for analysis. Reference peaks to CDCl$_3$ at δ 7.26 ppm. At each time point determine the mol % C—O—Si hydrolysis and C—O—C hydrolysis. Determine mol % C—O—Si hydrolysis by integrating dimethylvinyl silyl polyester peaks (C—O—Si (Me)$_2$Vi) at δ 0.16-0.18 ppm and hydrolyzed dimethylvinyl silyl group (HO—Si(Me)$_2$Vi) from δ 0.21-0.22. The mol % C—O—Si Hydrolysis was determined by assessing growth of resonances of the hydrolyzed dimethylvinyl silyl group (HO—Si(Me)$_2$Vi) present at δ 0.21-0.22 in CDCl$_3$ relative to the resonances of the non-hydrolyzed dimethylvinyl silyl polyester peaks at δ 0.16-0.18 ppm. Determine mol % C—O—C hydrolysis by integrating proton resonances of the non-hydrolyzed polyester (—CH$_2$—O—C(O)—C—) present at δ 4.21-4.26 ppm in CDCl$_3$ relative to those resonances present in the hydrolyzed composition (HO—C (O)—C) at 9-11 ppm in CDCl$_3$.

The results in Table 9 reveal that the C—O—C bond remains stable to hydrolysis while the C—O—Si bond nearly completely hydrolyzes in 25 hours. This affirms that C—O—Si linkages are less hydrolytically stable than C—O—C linkages.

TABLE 9

| Time (hours) | Mol % C—O—Si Hydrolysis | Mol % C—O—C Hydrolysis |
|---|---|---|
| 0 | 4 | 0 |
| 5 | 41 | 0 |
| 25 | 85 | 0 |

What is claimed is:

1. A composition comprising an elastomer, the elastomer characterized by having a polyester backbone crosslinked with a crosslinker and having a carbon-oxygen-silicon linkage between ester groups and crosslinkers, where the crosslinker is a polysiloxane.

2. The composition of claim 1, wherein the polyester backbone is free of silicon-oxygen-silicon linkages.

3. The composition of claim 1, where there is at least one carbon-oxygen-silicon linkage between any polyester and any siloxane linkage in the elastomer.

4. The composition of claim 1, wherein each polyester backbone has at least three bonds to crosslinkers and/or each crosslinker has at least three bonds to backbone polymers.

5. The composition of claim 1, wherein the elastomer is solvent swollen with a non-aqueous solvent.

6. The composition of claim 5, wherein the elastomer is present in particulate form and the composition is in the form of a paste.

7. A method for preparing the composition of claim 1, the method comprising preparing the elastomer by:
   a. providing a backbone polymer having at least two terminal unsaturated carbon-carbon bonds that are separated from any polyester group by a carbon-oxygen-silicon bond and a polysiloxane crosslinker material that contains multiple silylhydride groups provided that at least one of the backbone polymer or crosslinker has an average unsaturated carbon-carbon bond functionality of more than two and/or the crosslinker has an average silylhydride functionality of greater than two; and
   b. crosslinking the backbone polymer with the crosslinker material by hydrosilylation addition between unsaturated carbon-carbon bonds of the backbone polymer and silylhydride groups of the crosslinker material to form an elastomer.

8. The method of claim 7, wherein the hydrosilylation reaction is run in a non-aqueous solvent and produces a solvent-swollen elastomer, provided that if the non-aqueous solvent is a polysiloxane and the oganosilyl-functional polyester contains more than two terminal carbon-carbon double bonds then the crosslinker has a weight-average molecular weight of less than 7400.

9. The process of claim 8, further comprising:
  a. optionally adding additional non-aqueous solvent to the solvent-swollen elastomer; and
  b. subjecting the solvent-swollen elastomer to shear in order to break the solvent-swollen elastomer into particle form to produce a paste.

* * * * *